US007935421B2

(12) United States Patent
Lutz et al.

(10) Patent No.: US 7,935,421 B2
(45) Date of Patent: May 3, 2011

(54) POLYUREA COATINGS FOR GOLF EQUIPMENT

(75) Inventors: Mitchell E. Lutz, Fairhaven, MA (US); Matthew F. Hogge, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 192 days.

(21) Appl. No.: 11/798,118

(22) Filed: May 10, 2007

(65) Prior Publication Data

US 2007/0213145 A1    Sep. 13, 2007

Related U.S. Application Data

(63) Continuation of application No. 10/888,756, filed on Jul. 12, 2004, now Pat. No. 7,572,508.

(51) Int. Cl.
  *A63B 37/00* (2006.01)
  *A63B 37/14* (2006.01)
  *C09D 175/02* (2006.01)

(52) U.S. Cl. ............... 428/423.1; 427/385.5; 427/393.5; 525/123; 525/131; 528/68; 528/75; 473/351; 473/371

(58) Field of Classification Search .......................... None
See application file for complete search history.

(56) References Cited

U.S. PATENT DOCUMENTS

| | | | |
|---|---|---|---|
| 3,560,246 A | 2/1971 | Payne et al. | 427/393 |
| 3,595,839 A | 7/1971 | Stokes | 528/55 |
| 3,892,696 A | 7/1975 | Wood | 524/589 |
| 4,560,168 A | 12/1985 | Aoyama | 273/232 |
| 4,798,386 A | 1/1989 | Berard | 273/235 R |
| 4,871,589 A | 10/1989 | Kitaoh et al. | 427/322 |
| 4,925,193 A | 5/1990 | Melvin et al. | 273/232 |
| 4,960,281 A | 10/1990 | Aoyama | 273/232 |
| 5,000,458 A | 3/1991 | Proudfit | 273/235 A |
| 5,124,385 A | 6/1992 | Hegedus et al. | 524/204 |
| 5,124,447 A | 6/1992 | Squiller et al. | 528/45 |
| 5,243,012 A | 9/1993 | Wicks et al. | 528/58 |
| 5,249,804 A | 10/1993 | Sanchez | 273/232 |
| 5,300,325 A | 4/1994 | Nealon et al. | 427/379 |
| 5,316,730 A | 5/1994 | Blake et al. | 422/51 |
| 5,334,673 A | 8/1994 | Wu | 273/235 R |
| 5,409,233 A | 4/1995 | Kennedy | 273/235 A |
| 5,459,220 A | 10/1995 | Kennedy | 528/44 |
| 5,461,109 A | 10/1995 | Blair et al. | 524/839 |
| 5,484,870 A | 1/1996 | Wu | 528/28 |
| 5,494,291 A * | 2/1996 | Kennedy | 473/378 |
| 5,562,552 A | 10/1996 | Thurman | 473/379 |
| 5,575,477 A | 11/1996 | Hwang | 473/379 |
| 5,688,191 A | 11/1997 | Cavallaro et al. | 473/373 |
| 5,713,801 A | 2/1998 | Aoyama | 473/354 |
| 5,803,831 A | 9/1998 | Sullivan et al. | 473/374 |
| 5,820,491 A | 10/1998 | Hatch et al. | 473/378 |
| 5,840,788 A | 11/1998 | Lutz et al. | 524/95 |
| 5,849,168 A | 12/1998 | Lutz | 264/755 |
| 5,885,172 A | 3/1999 | Hebert et al. | 473/354 |
| 5,919,100 A | 7/1999 | Boehm et al. | 473/354 |
| 5,957,787 A | 9/1999 | Hwang | 473/379 |
| 5,965,669 A | 10/1999 | Cavallaro et al. | 525/221 |
| 5,981,654 A | 11/1999 | Rajagopalan | 525/66 |
| 5,981,658 A | 11/1999 | Rajagopalan et al. | 525/72 |
| 6,056,842 A | 5/2000 | Dalton et al. | 156/243 |
| 6,099,415 A | 8/2000 | Lutz | 473/357 |
| 6,129,881 A | 10/2000 | Puniello | 264/278 |
| 6,149,535 A | 11/2000 | Bissonnette et al. | 473/354 |
| 6,180,040 B1 | 1/2001 | Ladd et al. | 264/248 |
| 6,180,722 B1 | 1/2001 | Dalton et al. | 525/193 |
| 6,207,784 B1 | 3/2001 | Rajagopalan | 528/71 |
| 6,235,230 B1 | 5/2001 | Puniello | 264/278 |
| 6,241,622 B1 | 6/2001 | Gobush et al. | 473/199 |
| 6,248,804 B1 | 6/2001 | Lutz | 523/160 |
| 6,286,364 B1 | 9/2001 | Aoyama et al. | 73/65.03 |
| 6,290,615 B1 | 9/2001 | Ogg | 473/378 |
| 6,315,915 B1 | 11/2001 | Hebert et al. | 216/67 |
| 6,338,684 B1 | 1/2002 | Winfield et al. | 473/378 |
| 6,340,503 B1 | 1/2002 | Simonds et al. | 427/393.5 |
| 6,379,138 B1 | 4/2002 | Puniello et al. | 425/116 |
| 6,383,092 B1 | 5/2002 | Ogg | 473/378 |
| 6,409,615 B1 | 6/2002 | McGuire et al. | 473/383 |
| 6,488,591 B1 | 12/2002 | Gobush et al. | 473/199 |
| 6,500,073 B1 | 12/2002 | Gobush et al. | 473/199 |
| 6,500,495 B2 | 12/2002 | Lutz | 427/500 |
| 6,506,842 B1 | 1/2003 | Heck et al. | 525/194 |
| 6,596,837 B2 | 7/2003 | Hogge et al. | 528/49 |
| 7,008,997 B2 | 3/2006 | Kovacs | 524/770 |
| 2001/0009310 A1 | 7/2001 | Hebert et al. | |
| 2001/0018375 A1 | 8/2001 | Hayashi et al. | |
| 2001/0019971 A1 | 9/2001 | Hayashi et al. | |
| 2002/0025862 A1 | 2/2002 | Sullivan et al. | |
| 2002/0028885 A1 | 3/2002 | Sullivan et al. | |
| 2002/0040763 A1 | 4/2002 | Grenda et al. | |
| 2002/0151380 A1 | 10/2002 | Sullivan | |
| 2003/0096916 A1* | 5/2003 | Chao et al. | 525/333.2 |
| 2003/0158001 A1 | 8/2003 | Morgan et al. | |
| 2003/0220464 A1* | 11/2003 | Wu et al. | 528/61 |
| 2006/0009607 A1* | 1/2006 | Lutz et al. | 528/68 |

FOREIGN PATENT DOCUMENTS

WO    WO 92/19656    11/1992

OTHER PUBLICATIONS

U.S. Appl. No. 10/409,144, filed Apr. 9, 2003 entitled "Polyurea and Polyurethane Compositions for Golf Equipment".
U.S. Appl. No. 10/339,603, filed Jan. 10, 2003 entitled "Polyurethane Compositions for Golf Balls".
U.S. Appl. No. 10/228,311, filed Aug. 27, 2002 entitled "Golf Balls Comprising Light Stable Materials and Methods of Making Same".
U.S. Appl. No. 10/138,304, filed May 6, 2002 entitled "Golf Ball Incorporating Grafted Metallocene Catalyzed Polymer Blends".
U.S. Appl. No. 10/078,417, filed Aug. 21, 2003 entitled "Dimple Patterns for Golf Balls".
U.S. Appl. No. 09/742,435, filed Dec. 22, 2000 entitled "Split Vent Pin for Injection Molding".
U.S. Appl. No. 09/717,136, filed Nov. 22, 2000 entitled "Method of Making Golf Balls".
Marc Broekaert, Paint & Coatings Industry "Polyurea Spray Coatings: The Technology and Latest Developments", Oct. 2002.

* cited by examiner

*Primary Examiner* — David Buttner
(74) *Attorney, Agent, or Firm* — Murphy & King, P.C.

(57) ABSTRACT

A polyurea-based curable coating for use with sports equipment, such as golf balls, golf shoes, golf clubs, footballs, billiard balls, baseballs, and the like, of which the coating may be cured over time, with heat, or a combination thereof, providing enhanced adhesion to equipment surfaces, improved abrasion resistance, and increased water resistance.

17 Claims, 2 Drawing Sheets

POLYUREA COATINGS FOR GOLF EQUIPMENT

CROSS-REFERENCE TO RELATED APPLICATIONS

This application is a continuation of U.S. patent application Ser. No. 10/888,756, filed Jul. 12, 2004, now U.S. Pat. No. 7,572,508, the entire disclosure of which is incorporated by reference herein.

FIELD OF THE INVENTION

The present invention relates to coatings for sports equipment. In particular, the coating is a two-component polyurea-based curable coating that cures rapidly for use with game balls, e.g., golf balls, footballs, baseballs, billiard balls, and the like. In addition, the coating compositions of the invention may be used on golf shoes, golf clubs, and the like. The coating composition of the present invention may be cured over time, upon heat, or a combination thereof. In addition, the coatings of the invention have enhanced adhesion to sports equipment surfaces, which in turn improves post-processing, i.e., printing, coating, marking, etc, as well as durability of the finished equipment.

BACKGROUND OF THE INVENTION

Coating compositions are typically applied to sports equipment to protect the actual equipment, as well as any identifying indicia and any paint layers. For example, because conventional golf ball cover materials, i.e., balata, ionomer resins, and urethanes, suffer from abrasion and shear from repeated contact with golf clubs, golf ball manufacturers traditionally apply a coating to increase the abrasion resistance of the balls. In addition, coatings are used to improve the aesthetic quality of the equipment because of the high gloss. Traditional coatings, however, have not been entirely satisfactory to golf ball manufacturers or the golfing public.

Golf equipment manufacturers have been experimenting with various materials and manufacturing methods for coating golf equipment over the years in an attempt to further refine the manufacturing process. Conventional coatings generally include a clear primer coat and a clear top coat, although for certain applications a single clear coat may suffice. The primer layer is typically applied to promote adhesion or to smooth the surface roughness before the top coat(s) are added to the golf equipment. And, while coating compositions are generally free of pigmentation, they may contain small amounts of dye, pigment, and optical brighteners so long as they still allow for a bright ball cover. In addition, as briefly mentioned above, various identifying indicia may be applied either directly upon or alternatively upon the cover, the primer coat or the top coat.

Urethanes, urethane hybrids, polyesters and acrylics are conventional coating materials. In particular, a cured polyurethane top coat is most widely used as a protective coating composition material, which are typically either "one component" or "two component" systems. Such coatings may be classified as either water-based or nonaqueous solvent-based systems. One component systems are generally made up of minute polymeric particles (reacted or partially reacted) which are suspended or dispersed in one or more solvents. In contrast, the primary reactants in two component systems must be kept separate from one another until the actual coating need be applied to the golf equipment. Once the reactants are allowed to interact, however, polymerization occurs, which may be accompanied by or followed by evaporation of the solvent.

For example, a two component polyurethane system may include separate packages of polyol and diisocyanate, which are mixed together to yield a thermoset coating composition. In some cases, more than one curing mechanism may be used to cure the coating system, e.g., evaporation of solvent via ambient air in addition to the subjecting the coating to ultraviolet light. Examples of conventional polyurethane coating compositions are disclosed in International Publication No. WO 92/19656 and U.S. Pat. Nos. 5,459,220, 5,461,109, and 5,124,385.

While some conventional coating systems, including a few of those described above, do impart a measure of abrasion and impact resistance, a continuing need exists for improved coatings capable of providing enhanced abrasion resistance and adherence to balls without negatively affecting the performance of the coated object. In addition, there is a need in the art for coating compositions that have improved processing in non-optimal conditions, e.g., humid conditions. Moreover, a quick-cure coating composition that fully cures in all conditions is advantageous to reduce or eliminate any defects from wet transfer.

SUMMARY OF THE INVENTION

The present invention is directed to a coating composition for golf equipment including a reaction product of an amine-terminated compound and an isocyanate, wherein the reaction product consists of linkages having the general formula:

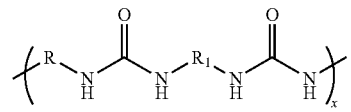

where x is about 1 or greater, and wherein R and $R_1$ are straight chain or branched hydrocarbon chains including about 1 to about 20 carbons. The golf equipment may be a golf ball.

In one embodiment, at least one of the amine-terminated compound or isocyanate are aliphatic. In another embodiment, the amine-terminated compound includes primary amines, secondary amines, or a combination thereof. In yet another embodiment, the amine-terminated compound is selected from the group consisting of amine-terminated hydrocarbons, amine-terminated polyethers, amine-terminated polyesters, amine-terminated polycarbonates, amine-terminated polycaprolactones, amine-terminated polyamides, and mixtures thereof.

In this aspect of the invention, the reaction product may have a cure time of about 5 minutes or greater. For example, the reaction product may have a cure time of about 15 minutes to about 30 minutes. In an alternate embodiment, the cure time is from about 30 minutes to about 60 minutes. The coating composition may have a dry film thickness of about 0.1 mils to about 1 mil.

The coating composition of the invention may include a solvent. In one embodiment, the solvent includes methyl isobutyl ketone, methyl amyl ketone, methyl isoamyl ketone, butyl acetate and propylene glycol monomethyl ether acetate, xylene, methoxy propyl acetate, N-methyl pyrrolidone, solvesso solvent, petroleum hydrocarbons, chlorobenzene, or mixtures thereof. In another embodiment, the solvent is present in the composition in an amount of about 20 percent to about 40 percent by weight of the coating composition.

The present invention also relates to a golf ball including a core, a cover, and a coating layer formed a composition including at least one isocyanate and at least one amine-terminated compound, wherein the composition is substantially free of solvent. In one embodiment, the at least one isocyanate and the at least one amine-terminated compound contain no carbon-carbon double bonds. The amine-terminated compound may be selected from the group consisting of amine-terminated hydrocarbons, amine-terminated polyethers, amine-terminated polyesters, amine-terminated polycarbonates, amine-terminated polycaprolactones, amine-terminated polyamides, and mixtures thereof.

In one embodiment, the composition includes linkages having the general formula:

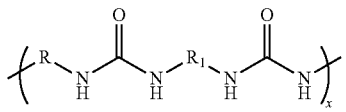

where x is about 1 or greater, and wherein R and $R_1$ are straight chain or branched hydrocarbon chains including about 1 to about 20 carbons.

In another embodiment, the amine-terminated compound includes two end segments selected from the group consisting of a primary amine, a secondary amine, or mixtures thereof. In still another embodiment, the composition further includes at least one an optical brightener, silane coupling agent, catalyst, pigment, filler, wetting agent, solvent, or a combination thereof.

In this aspect of the invention, the coating layer may have a dry film thickness of about 0.5 mils to about 3 mils. In one embodiment, the coating layer includes at least two layers.

The present invention is further directed to a golf ball including a core, a cover, and a coating layer disposed about the cover, wherein the coating layer is formed of coating composition including an isocyanate and an amine-terminated compound, wherein the coating composition includes linkages having the general formula:

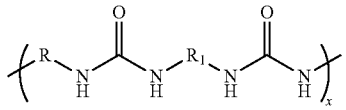

wherein x is about 1 or greater, and wherein R and $R_1$ are straight chain or branched hydrocarbon chains including about 1 to about 20 carbons, and wherein the coating has a 60° gloss of about 85 or greater. In one embodiment, the coating has a 60° gloss of about 90 or greater.

In this aspect of the invention, the coating composition preferably consists of linkages having the general formula:

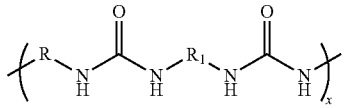

where x is about 1 or greater, and wherein R and $R_1$ are straight chain or branched hydrocarbon chains including about 1 to about 20 carbons. In an alternative embodiment, the coating composition includes linkages selected from the group consisting of:

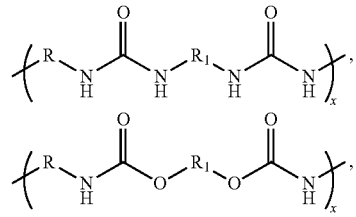

and mixtures thereof, wherein x is about 1 or greater, and wherein R and $R_1$ are straight chain or branched hydrocarbon chains having about 1 to about 20 carbons.

In one embodiment, the cure time is about 5 minutes to about 60 minutes. The coating layer may cure to a dry film thickness of about 0.1 mils to about 1 mil.

In this aspect of the invention, the coating composition may further include a solvent. In one embodiment, the solvent is selected from the group consisting of methyl isobutyl ketone, methyl amyl ketone, methyl isoamyl ketone, butyl acetate and propylene glycol monomethyl ether acetate, xylene, methoxy propyl acetate, N-methyl pyrrolidone, solvesso solvent, petroleum hydrocarbons, iso-butanol, butyl glycol, chlorobenzene, or mixtures thereof. In another embodiment, the solvent is present in the composition in an amount of about 10 percent to about 35 percent by weight of the coating composition.

The invention also contemplates a coating composition for game balls including a reaction product of an amine-terminated compound and an isocyanate, wherein the reaction product consists of linkages having the general formula:

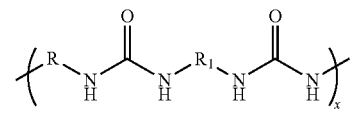

where x is about 1 or greater, and wherein R and $R_1$ are straight chain or branched hydrocarbon chains including about 1 to about 20 carbons. In one embodiment, the game balls comprise golf balls, footballs, billiard balls, baseballs, or softballs.

In this aspect of the invention, the amine-terminated compound may be selected from the group consisting of amine-terminated hydrocarbons, amine-terminated polyethers, amine-terminated polyesters, amine-terminated polycarbonates, amine-terminated polycaprolactones, amine-terminated polyamides, and mixtures thereof. In one embodiment, the reaction product has a cure time of about 15 minutes to about 30 minutes.

DETAILED DESCRIPTION OF THE INVENTION

Figure 1:
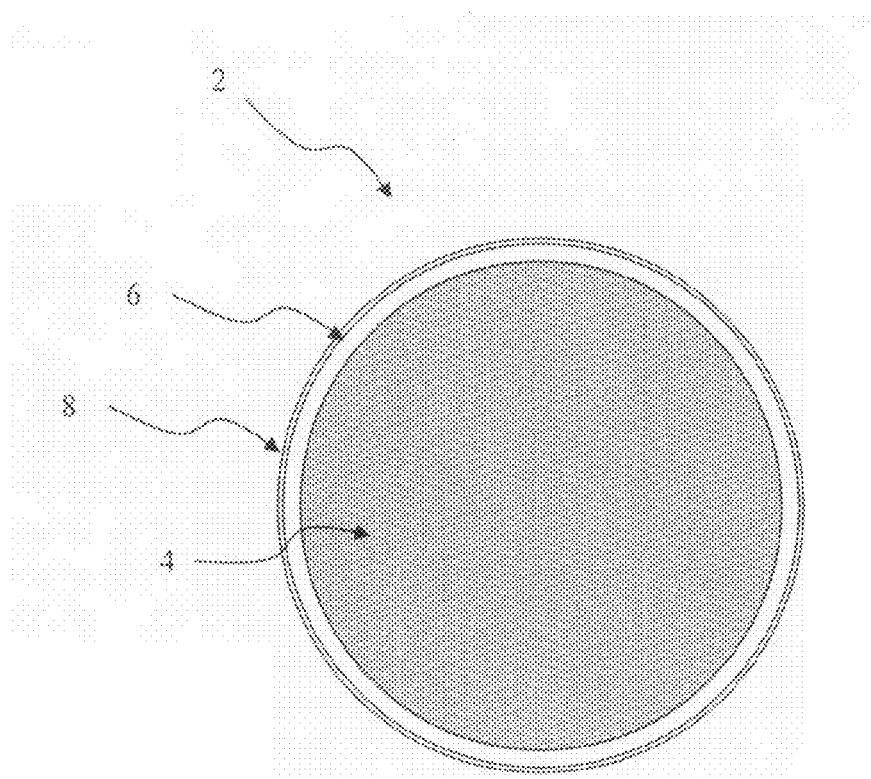
FIG. 1 is a cross-sectional view of a two layer ball, wherein a polyurea coating according to the invention is applied to the cover of the ball.
Figure 2:
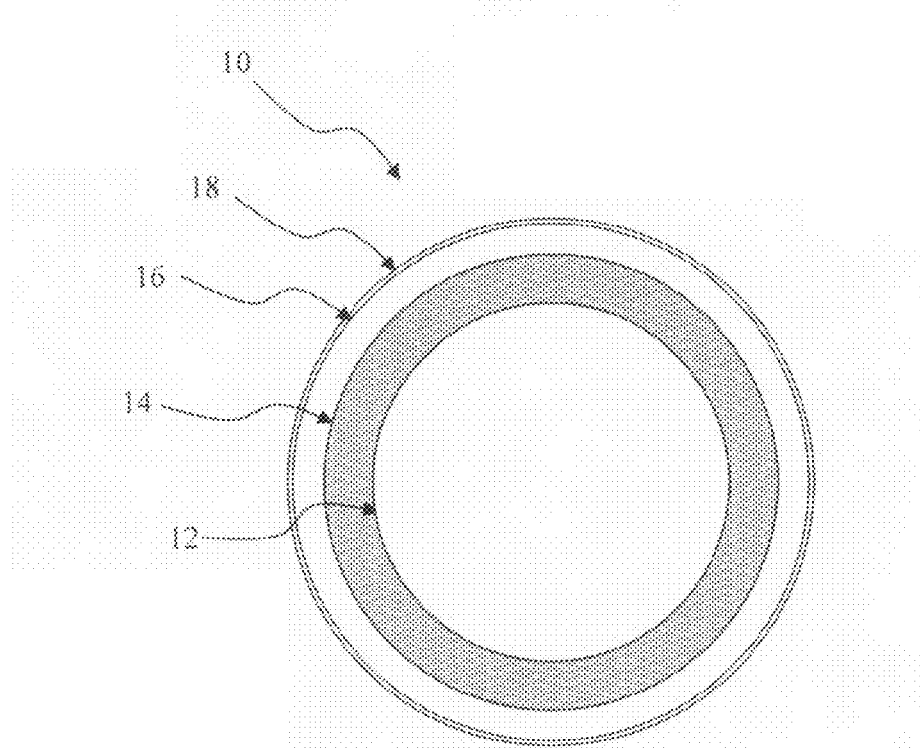
FIG. 2 is a cross-sectional view of a multi-component golf ball, wherein a polyurea coating according to the invention is applied to the cover of the ball.

The present invention is directed to coating compositions for golf equipment based on a two-component polyurea system. In particular, the polyurea coating compositions of the present invention include an isocyanate component and an amine-terminated compound. In one embodiment, the coating system of the present invention includes at least one isocyanate, at least one amine-terminated compound, and at least one solvent. In another embodiment, the coating system has a high solids content and substantially no solvent. In addition, the present invention relates to methods of forming the coating compositions of the invention, as well as producing coated golf equipment.

The coatings of the present invention advantageously improve adhesion to surface layers and durability over the lifetime of the equipment, as well as reducing the VOCs during manufacturing, decreasing curing time, increasing light stability, and decreasing sensitivity to environmental conditions. For example, the polyurea coatings of the invention have a substantially faster reaction cure time than the polyurethane and epoxy coatings of the prior art. Prior art polyurethane coatings can be sensitive to high humidity and moisture in or on a substrate. As a result, polyurethane coating materials will react with the atmospheric moisture or humidity and produce carbon dioxide gas, which may result in down glossing, foaming, and/or pinholing on the coated surface. In contrast, because the isocyanate reacts quickly and preferentially with the amine-terminated curing agent, as opposed to reacting with water, moisture or high humidity does not affect the polyurea coatings of the present invention and, thus, the coatings of the present invention may be applied in non-climate controlled atmospheres. And, even if the substrate has imperfections, the applied coating is preferably substantially free of pinholes or flaws, i.e., less than about 5 percent imperfections.

Furthermore, the coatings of the invention are temperature tolerant, enabling application of the coating to occur in a broad range of geographic locations, while still providing excellent physical properties, chemical resistance, and light stability. To increase light stability, at least one of the components of the coating composition is preferably aliphatic (also referred to herein as saturated) in nature. As used herein, the term "aliphatic" refers to components that are substantially free of unsaturated carbon-carbon bonds or aromatic groups. For example, aromatic compounds are understood by those of ordinary skill in the art to be a large class of compounds that contain benzene or compounds that resemble benzene in certain chemical properties, e.g., toluene, napthalene, and anthracene. Because compositions that contain such an aromatic component are susceptible to discoloration upon exposure to light, particularly ultraviolet (UV) light, the compositions of the present invention are preferably limited in the amount of aromatic components contained therein. In fact, in one embodiment, the coating compositions of the present invention contain only aliphatic components. Aliphatic amine-terminated compounds are understood to be any of a large class of organic amine-terminated compounds without C=C. For example, the hydrocarbons of the alkane, alkene, and alkyne series are aliphatic compounds, as are fatty acids and many other compounds.

The compositions of the invention may be used as a primer coat, or a topcoat. In addition, the coatings may be clear or pigmented. The coatings may be used on any type of golf equipment. In one embodiment, the polyurea coating is used on a golf ball, which may be a one-piece ball, a two-layer ball, a three-layer ball, or ball having more than three-layers, which will be discussed in more detail below.

Coating Compositions of the Invention

The coatings of the present invention are primarily polyurea-based and preferably include at least one isocyanate and at least one amine-terminated compound (or chain extender). The —NH of the amine-terminated compound and the —NCO of the isocyanate form the polyurea linkage. The polyurea-based coatings of the invention are distinctly different from polyurethane compositions, and may provide enhanced durability and adhesion, as well as aesthetic characteristics, when used in golf ball components. For example, pure polyurea coatings of the invention include only urea linkages, whereas polyurethane coatings contain urethane linkages.

For the purposes of the present invention, a pure polyurea composition, i.e., a polyurea/urea, contains only urea linkages having the following general structure:

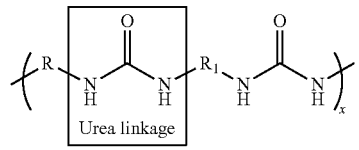
Urea linkage where x is the chain length, i.e., about 1 or greater, and R and $R_1$ are straight chain or branched hydrocarbon chains having about 1 to about 20 carbons. On the other hand, a hybrid polyurea/urethane composition contains both urea and urethane linkages and a pure polyurethane composition contains only urethane linkages, wherein the urethane linkages have the following general structure:

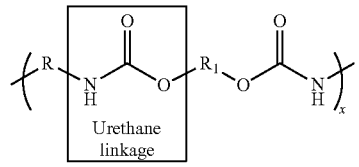
Urethane linkage where x is the chain length, i.e., about 1 or greater, and R and $R_1$ are straight chain or branched hydrocarbon chains having about 1 to about 20 carbons. For example, a hybrid polyurea coating may include a polyol, an isocyanate, and an amine-terminated compound such as aspartic ester, wherein both urea and urethane linkages are present in the coating composition.

Thus, in pure polyurea coatings of the invention, all hydroxy-terminated chain extenders typically present in polyurethane coatings are eliminated and replaced with amine-terminated chain extenders. This substitution minimizes the amount of oxygen in the compound, which promotes a greater degree of resistance against the large array of attackers to the oxygen molecule thereby improving chemical resistance. However, while pure polyurea is discussed herein, hybrid polyurea-urethane coatings are also contemplated for use with the present invention because the hybrids have many of the same beneficial properties of the pure polyurea coatings with decreased manufacturing costs. For example, in one embodiment, the coating may contain both aliphatic urea and aliphatic urethane linkages. In another embodiment, the coating contains aliphatic urethane linkages.

It should also be understood that the polyurea coatings of the invention are distinct from coating systems containing urea groups solely as a result of the reaction between isocyanate and water. It is well understood that isocyanate functionalities, while more reactive toward hydroxyl groups, also react with water. The product from such a reaction is a primary amine, which undergoes further reaction with excess isocyanate to yield a urea linkage, as set forth in the following reaction scheme:

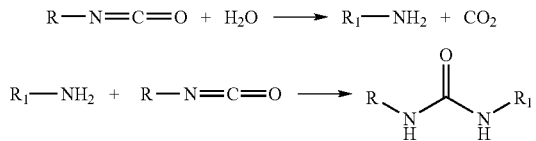

Thus, for the purposes of the present invention, the polyurea-based coatings described herein do not include coatings containing urea linkages formed from the reaction scheme above.

The polyurea-based coatings of the invention may be prepared from at least one isocyanate and at least one amine-terminated compound. And, as discussed above, the coating components are preferably aliphatic in nature. In one embodiment, at least one of the isocyanate and amine-terminated compound are aliphatic. In another embodiment, the coating compositions contain only aliphatic components.

In addition, the coatings of the present invention may include a solvent. In particular, a solvent is used for coating compositions to achieve a specific viscosity and enable flow for the application of the coating. When the coating composition is based on a high solids content, less solvent may be used to achieve the viscosity and flow properties desired. Furthermore, an additional reactive component, such as a diol or epoxy, may also be included in the coating composition of the invention in order to enhance the reaction or adjust coating properties.

As discussed above, at least one of the coating components are aliphatic in nature. Preferably, all of the coating components are aliphatic in nature. The particular components of the polyurea coating compositions of the invention will be discussed in greater detail below.

Amine-Terminated Compound

Any amine-terminated compound available to one of ordinary skill in the art is suitable for use in the polyurea prepolymer. However, as discussed above, while aromatic amine-terminated compounds are contemplated for the present invention, aliphatic amine-terminated compounds are preferred due to improved light stability of the coating composition.

The amine-terminated compounds may be in the form of a primary amine ($NH_2$), a secondary amine (NHR), or mixtures thereof. For instance, amine-terminated hydrocarbons, amine-terminated polyethers, amine-terminated polyesters, amine-terminated polycarbonates, amine-terminated polycaprolactones, amine-terminated polyamides, and mixtures thereof are contemplated for use with the present invention. Examples of suitable amine-terminated compounds and their generic structures are discussed in U.S. patent application Ser. No. 10/409,144, filed Apr. 9, 2003, entitled "Polyurea and Polyurethane Compositions for Golf Equipment," which is incorporated in its entirety by reference herein.

Another example of an amine-terminated compound suitable for use with the present invention is an aspartic ester, which is a secondary amine derived from a primary polyamine and a dialkyl maleic or fumaric acid ester. Suitable methods for forming aspartic esters are disclosed in U.S. Pat. No. 5,243,012, which is incorporated by reference herein. Suitable primary polyamines include, but are not limited to, ethylene diamine, 1,2-diaminopropane, 1,4-diaminobutane, 1,3-diaminopentane, 1,6-diaminohexane, 2,5-diamino-2,5-dimethlhexane, 2,2,4- and/or 2,4,4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4' and/or 4,4'-diaminodicyclohexyl methane and 3,3'-dialkyl-4,4'-diamino-dicyclohexyl methanes such as 3,3'-dimethyl-4,4-diamino-dicyclohexyl methane and 3,3'-diethyl-4,4'-diaminodicyclohexyl methane; aromatic polyamines such as 2,4- and/or 2,6-diaminotoluene and 2,6-diaminotoluene and 2,4' and/or 4,4'-diaminodiphenyl methane; and polyoxyalkylene polyamines (also referred to herein as amine terminated polyethers), especially diamines, as are described herein below. Mixtures of polyamines may also be employed in preparing the aspartic esters used in the practice of this invention. Representative examples of useful maleic acid esters include dimethyl maleate, diethyl maleate, dibutyl maleate, dioctyl maleate, and mixtures thereof.

The aspartic ester derived polyureas have a number of advantageous properties, such as smooth, glossy film surface, excellent elongation (high) at a high elastomer strength, excellent ultraviolet color stability, good low temperature property retention and flexibility, slower reactivity for ease of processing and substrate wet-out (improved adhesion). Because polyurea compositions are known to have very rapid reactions, the use of an aspartic ester is beneficial because it allows a skilled artisan to slow down the polymerization reaction if desired.

Other amine-terminated compounds that may be useful in forming the polyurea coatings of the present invention include, but are not limited to, poly(acrylonitrile-co-butadiene); poly(1,4-butanediol) bis(4-aminobenzoate) in liquid or waxy solid form; linear and branched polyethylenimine; low and high molecular weight polyethylenimine having an average molecular weight of about 500 to about 30,000; poly (propylene glycol) bis(2-aminopropyl ether) having an average molecular weight of about 200 to about 5,000; polytetrahydrofuran bis(3-aminopropyl) terminated having an average molecular weight of about 200 to about 2000; and mixtures thereof, all of which are available from Aldrich of Milwaukee, Wis.

The molecular weight of the amine-terminated compound for use in the invention may range from about 100 to about 10,000. As used herein, the term "about" is used in connection with one or more numbers or numerical ranges, should be understood to refer to all such numbers, including all numbers in a range. In one embodiment, the amine-terminated compound is about 500 or greater, preferably about 1000 or greater, and even more preferably about 2000 or greater. In another embodiment, the amine-terminated compound molecular weight is about 8000 or less, preferably about 4,000 or less, and more preferably about 3,000 or less. For example, in one embodiment, the molecular weight of the amine-terminated compound is about 1000 to about 4000. In some cases, a higher molecular weight amine-terminated compound is preferred. For example, a suitable amine-terminated compound for use with the present invention is an amine terminated polyether, including a primary or secondary amine terminated polyether of greater than 1,500 average molecular weight, having a functionally of from about 2 to about 6, preferably from about 2 to about 3, and amine equivalent weight of from about 750 to about 4,000. Such amine-terminated polyethers are available under the tradename JEFFAMINE®, which are manufactured by Huntsman Corporation.

In addition, by using amine-terminated moieties based on a hydrophobic segment, the polyurea coating compositions of the invention may be more water resistant than those polyurea coating compositions formed with an amine-terminated hydrophilic segment. Thus, in one embodiment, the amine-terminated compound includes hydrophobic backbone, e.g., an unsaturated or saturated hydrocarbon-based amine-terminated compound, preferably saturated. One example of an amine-terminated hydrocarbon is an amine-terminated polybutadiene.

The amine-terminated compound may also be blended with additional polyols to formulate copolymers that are reacted with excess isocyanate to form the polyurea prepolymer. Once a polyol is used, however, the excess isocyanate in the polyurea prepolymer reacts with the hydroxyl groups in the polyol and forms urethane linkages, which results in a coating composition that is no longer pure polyurea, but instead a hybrid polyurea/urethane composition. Such a composition is distinct from a polyurea composition including only isocyanate, an amine-terminated compound, and a curing agent.

Isocyanate Component

Any isocyanate available to one of ordinary skill in the art is suitable for use according to the invention. As discussed above, however, aliphatic isocyanates are preferred for use in the coating compositions of the invention. Thus, isocyanates for use with the present invention preferably include aliphatic, cycloaliphatic, aromatic aliphatic, any derivatives thereof, and combinations of these compounds having two or more isocyanate (NCO) groups per molecule. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI).

The isocyanates may be organic polyisocyanate-terminated prepolymers, low free isocyanate prepolymer, and mixtures thereof. The isocyanate-containing reactable component may also include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic or linear or branched hydrocarbon moiety containing from about 1 to about 20 carbon atoms. When multiple cyclic groups are present, linear and/or branched hydrocarbons containing from about 1 to about 10 carbon atoms can be present as spacers between the cyclic groups. In some cases, the cyclic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of aliphatic isocyanates that can be used with the present invention include, but are not limited to, substituted and isomeric mixtures including ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); dimerized uretdione of any aliphatic polyisocyanate, such as uretdione of hexamethylene diisocyanate; modified polyisocyanate derived from the above isocyanates and polyisocyanates; and mixtures thereof.

Moreover, biurets of isocyanates and isocyanurate trimers of isocyanates are contemplated for use in the coating compositions of the invention. The general formula for each is as follows:

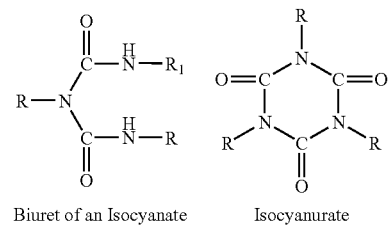

Biuret of an Isocyanate     Isocyanurate where R and $R_1$ may be any organic radical having a valence x. In one embodiment, R is a straight or branched hydrocarbon moiety, acyclic group, cyclic group, heterocyclic group, aromatic group, phenyl group, or a mixture thereof. In another embodiment, R is unsubstituted or substituted. For example, in some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

In particular, without being bound by any particular theory, it is believed that superior color retention, adhesion, and abrasion resistance can be achieved with the use of a biuret of HDI or an isocyanurate trimer of HDI. The general formulae for each is as follows:

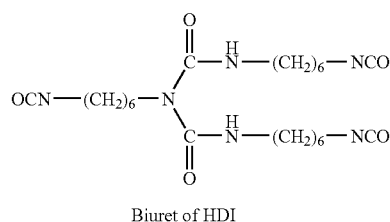

Biuret of HDI

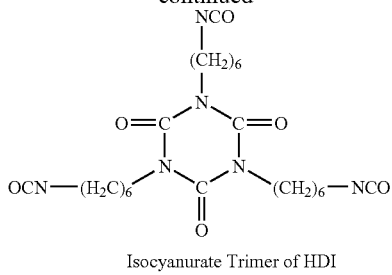

Isocyanurate Trimer of HDI

While aliphatic isocyanates are discussed primarily herein, aromatic isocyanates are also contemplated for use with the present invention. However, the use of aromatic components decreases the light stability of the coating composition as compared to a coating composition containing only aliphatic components.

Solvents

Because polyurea coatings require a lower viscosity in order to enable flow while applying, the polyurea coating systems of the invention may include a solvent, but do not necessarily require a solvent. When included in the composition, the solvent freely evaporates and leaves a smooth surface once applied to an article. Any solvent typically used for polyurethane coating systems is contemplated for use on a limited basis with the polyurea coatings of the present invention. Suitable solvents include, but are not limited to, methyl isobutyl ketone, methyl amyl ketone, methyl isoamyl ketone, butyl acetate and propylene glycol monomethyl ether acetate, xylene, methoxy propyl acetate, N-methyl pyrrolidone, solvesso solvent, petroleum hydrocarbons, chlorobenzene, and mixtures thereof. Urethane grade solvents, i.e., low-moisture solvents, are preferred. In addition, because the polyurea coating components rapidly react, when used, the solvents must also be fast evaporating.

In one embodiment, the solvent is present in an amount of about 10 percent to about 65 percent by weight of the polyurea coating compositions. In another embodiment, the amount of solvent is about 20 percent to about 65 percent by weight of the composition. In still another embodiment, the solvent is present in the composition in an amount of about 20 percent to about 40 percent by weight of the coating composition. In yet another embodiment, the coating composition includes about 10 percent to about 35 percent by weight solvent.

As mentioned above, whereas solvents are necessary in polyurethane coating systems due to the slow reaction, solvents are not necessary in the fast-reacting polyurea coating systems of the present invention. Low amounts of solvent are particularly useful when the polyurea coating composition has a high solids content, i.e., about 40 percent or greater. In one embodiment, the coating composition of the invention has a solids content of about 40 percent to about 40 percent. In another embodiment, the solid content of the polyurea coating composition is about 60 percent to about 100 percent. In still another embodiment, the solids content is about 80 percent to about 100 percent. Thus, in a high solids content coating according to the invention, about 10 percent or less solvent (by weight of the coating composition) is included in the polyurea coating. In another embodiment, the polyurea coating composition includes about 5 percent or less solvent. In still another embodiment, the polyurea coating composition is substantially free of solvent. As used herein, the term "substantially free" means that about 3 percent or less solvent, preferably about 2 percent or less, and more preferably about 1 percent or less, is included in the polyurea composition of the invention.

Reactive Components

As briefly mentioned above, the polyurea coatings of the present invention are preferably two-component systems. At least one additional reactive component, however, may allow a manufacturer to enhance or adjust the properties of the coating composition.

The reactive component may be a single amine-terminated compound or a mixture of amine-terminated compounds. Preferably, the reactive component is a secondary diamine so that the composition contains only urea linkages. In addition, the reactive component is preferably aliphatic in nature so as to increase the light stability of the overall coating composition.

Suitable aliphatic amine-terminated compounds include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl) ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; and mixtures thereof. In addition, any of the amine-terminated compounds discussed above (with respect to the amine-terminated component of the polyurea coating) may be used as curing agents to react with the polyurea prepolymers.

Moreover, the amine-terminated compound preferably has a molecular weight of about 64 or greater. In one embodiment, the amine-terminated compound has a molecular weight of about 2000 or less.

And, as briefly discussed above, while amine-terminated compounds are preferred is reactive components are employed, the polyurea coatings of the invention may also be hybrids, i.e., a mixture of urea and urethane linkages. Thus, the use of a single hydroxy-terminated compound or a mixture of hydroxy-terminated compounds is contemplated for use in the coating compositions of the invention. For example, polyesters, polyamines, polyamides, epoxies with a second hydroxyl group, phenolic resins, hydroxy functional acrylics, and the like may be used as a reactive component for the present invention.

Moreover, because the coating compositions of the invention may include a pigment, a modified reactive component blend, such as the ones disclosed in co-pending U.S. patent application Ser. No. 10/339,603, filed Jan. 10, 2003, entitled "Polyurethane Compositions for Golf Balls," which is incorporated by reference herein in its entirety, is contemplated for use with the present invention. For example, the reactive component of the invention may be modified with a freezing point depressing agent to create a blend with a slower onset of solidification and with storage stable pigment dispersion. A number of amine-terminated reactive compounds have relatively high freezing points, e.g., hexamethylene diamine (105.8° F.), diethanolamine (82.4° F.), triethanol amine (69.8° F.), diisopropanolamine (73.4° F.), and triisopropanolamine (111.2° F.). Such amine-terminated reactive compounds may be modified with an amine-terminated freezing point depressing agent or a mixture of amine-terminated freezing point depressing agents. Suitable amine-terminated freezing point depressing agents include, but are not limited to, ethylene diamine, 1,3-diaminopropane, dimethylamino propylamine, tetraethylene pentamine, 1,2-propylenediamine, diethylaminopropylamine, 2,2,4-trimethyl-1,6-hexanediamine, 2,4,4-trimethyl-1,6-hexanediamine, and mixtures thereof.

Additives

The compositions of the invention described above may also include various additives. For example, the polyurea coatings of the invention may also include pigments, tints, dyes, and fillers in an amount to provide visible coloration in the coatings. Other materials conventionally included in coating compositions may also be added to the compositions of the invention. These additional materials include, but are not limited to, reaction enhancers or catalysts, crosslinking agents, optical brighteners, propylene carbonates, such as those disclosed in U.S. Pat. No. 5,840,788, which is incorporated in its entirety by reference herein, coloring agents, fluorescent agents, whitening agents, UV absorbers, hindered amine light stabilizers, defoaming agents, processing aids, mica, talc, nano-fillers, wetting agents, solvents, and other conventional additives. All of these materials, which are well known in the art, are added for their usual purpose in typical amounts. For example, the additive(s) is preferably present in an amount of about 15 percent or less. In one embodiment, the additive is present in an amount of about 5 percent or less by weight of the coating composition.

And, although the present invention addresses prior art adhesion and abrasion resistance problems, additional adhesion promoters and/or abrasion resistant promoters may also be of use in the present composition to further increase the abrasion resistance of the coatings of the invention. For example, U.S. Pat. No. 5,820,491, the entire disclosure of which is incorporated by reference herein, discussed the inclusion of adhesion promoters in an amount of about 0.5 weight percent to about 20 weight percent, preferably from about 1 weight percent to about 15 weight percent, and more preferably from about 1.5 weight percent to about 10 weight percent. Adhesion promoters include, but not limited to colloidal silica. When included in the coating compositions of the invention, the colloidal silica is typically present in an amount of greater than 5 weight percent, preferably about 5 to 80 percent, and more preferably from about 5 to 60 percent by weight of the composition. In one preferred embodiment, the colloidal silica is present in an amount of about 10 to 30 percent, and in another preferred embodiment it is present in an amount from about 15 to 20 percent by weight of the composition.

An example of a suitable abrasion resistant filler is colloidal silica, as disclosed in U.S. Pat. No. 6,596,837, which is incorporated by reference herein in its entirety.

Methods of Forming the Coating Compositions

The polyurea coatings of the invention may be formed in a variety of ways. The components of the coating composition are preferably curable by heat, time, or a combination thereof. For example, the polyurea coating may be cured and dried at temperatures of 60° C. or lower. And, in one embodiment, the coating composition is cured with a combination of heat over a specified time period.

Mixing methods are also not critical and may include handmixing and a pressure pot, piston-pump proportioners, RCS, Graco P-Mix, Plura-Paint Triple, or various combinations thereof. For example, one method involves using two or more pressure pots to deliver the coating material to a manifold. Yet another mixing technique involves an electronic control system, using flow meters to properly meter out the individual components. By using multiple valves to open and close the flow of each side to the mixing chamber, material is metered out one side at a time. The resin and catalyst are then combined in a "fluid integrator" before moving on to the static mix tube. This technology may not be well suited for spray applications, however, because the piston pumps are unable to deliver pulse-free material flow.

The coating compositions may be applied in many different ways. Examples of application techniques include dipping, spraying and brushing. If the coating is applied over a golf ball, for example, spraying is preferred. The methods for applying the coating to golf equipment will be discussed in more detail below.

Golf Equipment

The coatings of the invention may be applied to any type of golf equipment, e.g., golf balls, golf clubs, golf shoes, golf bags, and golf gloves, and components thereof. For example, the coating can be disposed over at least a portion of the back cavity of an iron-type club, the club face, the crown of a metal wood-type club, or the sole of a metal wood-type club to inhibit or avoid abrasion of the club itself.

When the polyurea coatings of the present invention are used with a golf ball, the golf ball may be of any type of ball construction. For example, two-piece, three-piece, and four-piece golf ball designs may be coated with the polyurea coatings of the invention. In particular, golf balls having double cores, intermediate layer(s), and/or double covers are also contemplated for use with the coatings of the present invention.

Figure 3:
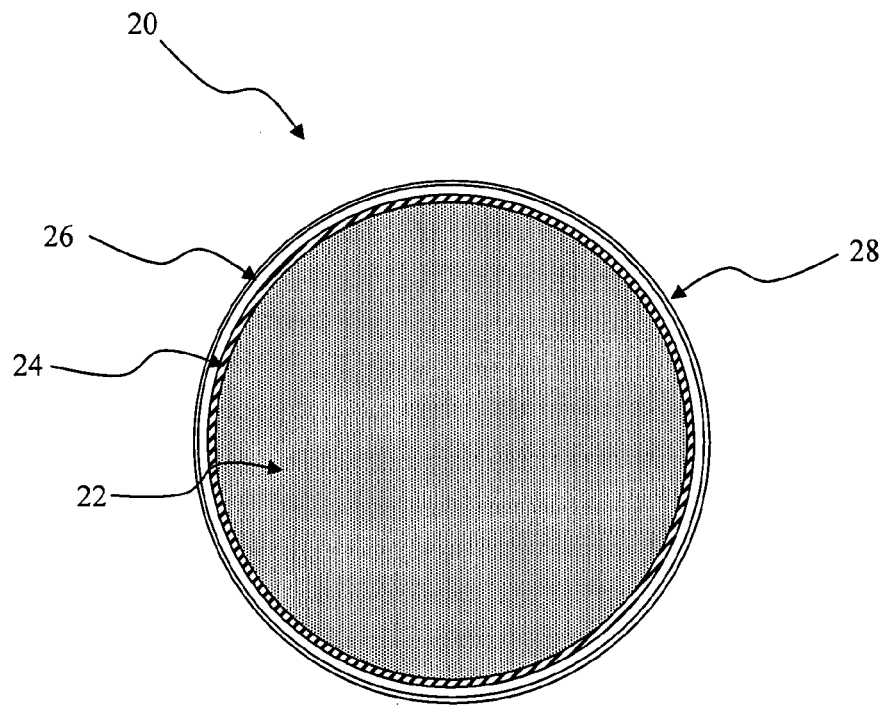
FIG. 3 is a cross-sectional view of a multi-component golf ball having a large core, wherein a polyurea coating according to the invention is applied to the outer cover of the ball.
Figure 4:
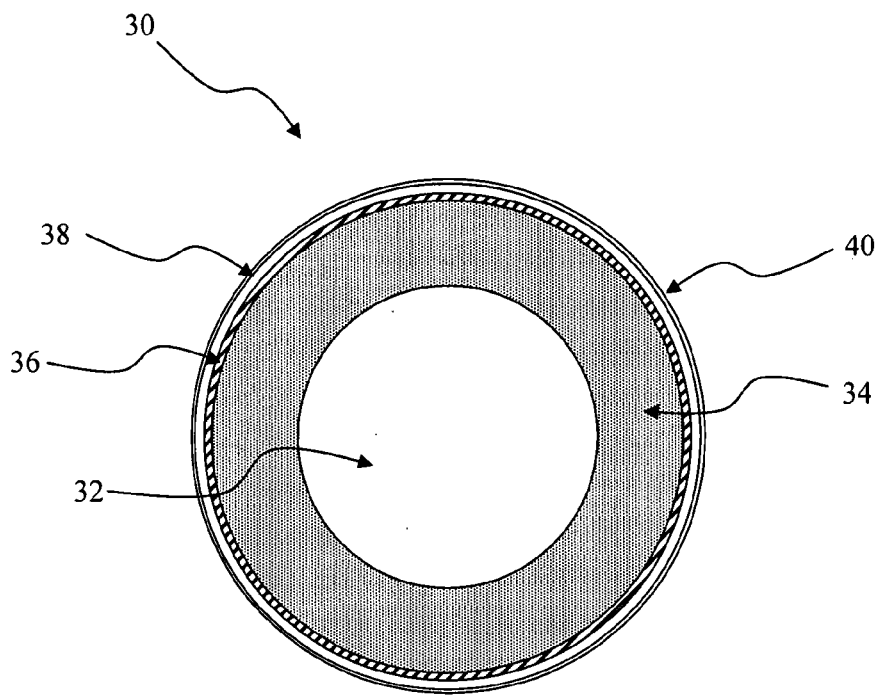
FIG. 4 is a cross-sectional view of a multi-component golf ball including a core, an outer core layer, a thin inner cover layer, and a thin outer cover layer disposed thereon, wherein a polyurea coating according to the invention is applied to the cover of the ball.

In one embodiment, a golf ball 2 according to the invention (as shown in FIG. 1) includes a core 4, a cover 6, and a coating layer 8. Similarly, golf ball 10 includes a core 12, a cover 16, and an intermediate layer 14 disposed between the core 12 and cover 16, which is protected with a coating layer 18 of the present invention. In addition, FIG. 3 illustrates a three-piece golf ball 20 including a large core 22, a thin inner cover layer or intermediate layer 26, and a thin outer cover layer 28 coated with a polyurea coating layer 28 according to the present invention. A four-piece golf ball 30, which includes a large core 32, an outer core layer or intermediate layer 34, a thin inner cover layer or intermediate layer 36, and a thin outer cover layer 38 coated with a polyurea coating layer 40 according to the present invention (FIG. 4). It is important to note that the dimensions of the coating layer are exaggerated to show the presence of the coating layer, however, as known to those of ordinary skill in the art, the coating layer is much thinner than any of the structural layers of the golf ball.

Other non-limiting examples of suitable types of ball constructions that may be used with the coatings of the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, US2002/0028885, US2002/0151380. The entire disclosures of these patents and published patent applications are incorporated by reference herein.

As discussed, the golf balls of the invention may include core layers, intermediate layers, or cover layers formed from materials known to those of skill in the art. The examples below for the structural layers of golf balls are not exhaustive, as skilled artisans would be aware that a variety of materials might be used to produce a golf ball of the invention with desired performance properties.

Core Layer(s)

The cores of the golf balls formed according to the invention may be solid, semi-solid, hollow, fluid-filled, or powder filled. As used herein, the term "core" means the innermost portion of a golf ball, and may include one or more layers. For example, U.S. Pat. Nos. 6,180,040 and 6,180,722 disclose methods of preparing dual core golf balls. The entire disclosures of these patents are incorporated by reference herein. The core may also include one or more wound layers (surrounding a fluid or solid center) including at least one tensioned elastomeric material wound about the center. In one embodiment, the tensioned elastomeric material includes natural or synthetic elastomers or blends thereof. The cores of the golf balls of the invention may be spherical, cubical, pyramid-shaped, geodesic, or any three-dimensional, symmetrical shape.

Suitable core materials include, but are not limited to, thermoset materials, such as rubber, styrene butadiene, polybutadiene, isoprene, polyisoprene, trans-isoprene, and polyurethane, and thermoplastic materials, such as conventional ionomer resins, polyamides, polyesters, and polyurethane.

Intermediate Layer(s)

As used herein, "intermediate layer" includes any layer between the innermost layer of the golf ball and the outermost layer of the golf ball. Therefore, intermediate layers may also be referred to as outer core layers, inner cover layers, and the like. When the golf ball of the present invention includes an intermediate layer, this layer may include any materials known to those of ordinary skill in the art, including various thermoset and thermoplastic materials, as well as blends thereof. For example, the intermediate layers of the golf ball of the invention may be formed, at least in part, from one or more homopolymeric or copolymeric materials, such as vinyl resins, polyolefins, polyurethanes, polyureas, polyamides, acrylic resins, olefinic thermoplastic rubbers, block copolymers of styrene and butadiene, isoprene or ethylene-butylene rubber, copoly(ether-amide), polyphenylene oxide resins, thermoplastic polyesters, ethylene, propylene, 1-butene or 1-hexene based homopolymers or copolymers, and the like.

The intermediate layer may also be formed from highly neutralized polymers such as those disclosed U.S. Patent Publication No. 2001/0018375 and 2001/0019971, which are incorporated herein in their entirety by express reference thereto; grafted and non-grafted metallocene catalyzed polyolefins and polyamides, polyamide/ionomer blends, and polyamide/nonionomer blends, such as those disclosed in U.S. patent application Ser. No. 10/138,304, filed May 6, 2002, entitled "Golf Ball Incorporating Grafted Metallocene Catalyzed Polymer Blends," which is incorporated by reference herein in its entirety; among other polymers. Examples of other suitable intermediate layer materials include blends of some of the above materials, such as those disclosed in U.S. Pat. No. 5,688,181, the entire disclosure of which is incorporated by reference herein.

Cover Layer(s)

The cover provides the interface between the ball and a club. As used herein, the term "cover" means the outermost portion of a golf ball. A cover typically includes at least one layer and may contain indentations such as dimples and/or ridges. The cover may include a plurality of layers, e.g., an inner cover layer disposed about a golf ball center and an outer cover layer formed thereon.

The inner and/or outer cover layers of golf balls of the present invention may be formed of the ionomer compositions (partially, highly, or fully neutralized), other cover materials known to those of skill in the art, or blends thereof. For example, the cover may be formed of polyurea, polyurethane, or mixtures thereof, as disclosed in co-pending U.S. patent application Ser. Nos. 10/228,311, filed Aug. 27, 2002, entitled "Golf Balls Comprising Light Stable Materials and Methods of Making Same," and 10/339,603, filed Jan. 10, 2003, entitled "Polyurethane Compositions for Golf Balls." The entire disclosures of these applications are incorporated by reference herein.

In addition, cover layers may also be formed of one or more homopolymeric or copolymeric materials, such as vinyl resins, polyolefins, conventional polyurethanes and polyureas, such as the ones disclosed in U.S. Pat. Nos. 5,334,673, and 5,484,870, polyamides, acrylic resins and blends of these resins with poly vinyl chloride, elastomers, and the like, thermoplastic urethanes, olefinic thermoplastic rubbers, block copolymers of styrene and butadiene, polyphenylene oxide resins or blends of polyphenylene oxide with high impact polystyrene, thermoplastic polyesters, ethylene, propylene, 1-butene or 1-hexane based homopolymers or copolymers including functional monomers, methyl acrylate, methyl methacrylate homopolymers and copolymers, low acid ionomers, high acid ionomers, alloys, and mixtures thereof. The cover may also be at least partially formed from a polybutadiene reaction product.

Additional materials may be included in the core, intermediate layer, and cover layer compositions outlined above. For example, catalysts, coloring agents, optical brighteners, crosslinking agents, whitening agents such as $TiO_2$ and $ZnO$, UV absorbers, hindered amine light stabilizers, defoaming agents, processing aids, surfactants, and other conventional additives may be added to the cover layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the cover layer compositions. Those of ordinary skill in the art should be aware of the requisite amount for each type of additive to realize the benefits of that particular additive.

Dimples

The golf balls of the invention are preferably designed with certain flight characteristics in mind. The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Alternatively, the dimple pattern can be arranged according to phyllotactic patterns, such as described in U.S. Pat. No. 6,338,684, which is incorporated herein in its entirety. Other dimple patterns and shapes, such as those discussed in U.S. patent application Ser. No. 10/078,417, U.S. Pat. Nos. 6,409,615, 6,290,615, 6,383,092, all of which are incorporated in its entirety by reference herein.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball.

The total number of dimples on the ball, or dimple count, may vary depending such factors as the sizes of the dimples and the pattern selected. In general, the total number of dimples on the ball preferably is between about 100 to about 1000 dimples, although one skilled in the art would recognize that differing dimple counts within this range can significantly alter the flight performance of the ball. In one embodiment, the dimple count is about 380 dimples or greater, but more preferably is about 400 dimples or greater, and even more preferably is about 420 dimples or greater. In some cases, it may be desirable to have fewer dimples on the ball, e.g., about 380 dimples or less, and more preferably is about 350 dimples or less.

Methods for Forming Golf Balls

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. A method of injection molding using a split vent pin can be found in co-pending U.S. patent application Ser. No. 09/742,435, filed Dec. 22, 2000, entitled "Split Vent Pin for Injection Molding." Examples of retractable pin injection molding may be found in U.S. Pat. Nos. 6,129,881, 6,235,230, and 6,379,138. These molding references are incorporated in their entirety by reference herein. In addition, a chilled chamber, i.e., a cooling jacket, such as the one disclosed in U.S. patent application Ser. No. 09/717,136, filed Nov. 22, 2000, entitled "Method of Making Golf Balls" may be used to cool the compositions of the invention when casting, which also allows for a higher loading of catalyst into the system.

One skilled in the art would appreciate that the molding method used may be determined at least partially by the properties of the composition. For example, casting, RIM, or LIM may be preferred when the material is thermoset, whereas compression molding or injection molding may be preferred for thermoplastic compositions. Compression molding, however, may also be used for thermoset inner ball materials. For example, when cores are formed from a thermoset material, compression molding is a particularly suitable method of forming the core, whereas when the cores are formed of a thermoplastic material, the cores may be injection molded. In addition, the intermediate layer may also be formed from using any suitable method known to those of ordinary skill in the art. For example, an intermediate layer may be formed by blow molding and covered with a dimpled cover layer formed by injection molding, compression molding, casting, vacuum forming, powder coating, and the like.

The methods discussed herein and other manufacturing methods for forming the golf ball components of the present invention are also disclosed in U.S. Pat. Nos. 6,207,784 and 5,484,870, the disclosures of which are incorporated herein by reference in their entirety.

Additionally, while the coatings of the present invention improve adhesion between the cover layer and the coating layer(s), prior to forming the cover layer, the inner ball, i.e., the core and any intermediate layers disposed thereon, may be surface treated to further increase the adhesion between the outer surface of the cover and the coating. Examples of such surface treatment may include mechanically or chemically abrading the outer surface of the subassembly. Additionally, the ball may be subjected to corona discharge, plasma treatment, and/or silane dipping prior to coating. Examples of these and other surface treatment techniques can be found in U.S. Pat. No. 6,315,915, which is incorporated by reference in its entirety.

Golf Ball Post-Processing

As briefly discussed above, a golf ball may be coated in a variety of ways, e.g., spraying, skip-spraying, dipping, painting, e.g., brushing or rolling, electrostatic coating, and other coating methods conventionally used in the art, such as those methods described in for example U.S. Pat. Nos. 6,340,503, 5,461,109, 5,409,233, 5,000,458, 4,871,589, 4,798,386 and 5,300,325, the entire disclosures of which are incorporated herein by express reference. For example, the coating layer(s) may be applied to the golf ball cover by an in-mold coating process, such as described in U.S. Pat. No. 5,849,168, which is incorporated in its entirety by reference herein.

The amount of coating applied to a standard-sized golf ball (1.680 inch diameter) is in the range of 0.01 g to 1 g. Preferred reaction and coating conditions vary with both the chemical compositions and the application methodology but are well known in the art. Likewise, the thickness of the coating may vary depending on the desired degree of protection. For example, in one embodiment, the thickness of the coating is about 5 µm to about 40 µm. In another embodiment, the thickness of the coating is about 30 µm or less. In still another embodiment, the coating has a thickness of about 10 µm to about 20 µm. Alternatively, the thickness of the coating may be much greater. In one embodiment, the coating has a thickness of about 0.2 mm or less. In another embodiment, the coating is about 0.05 mm to about 0.15 mm thick.

As briefly mentioned above, the polyurea coatings of the present invention allow for accelerated curing/drying times, which also advantageously provides a tack free-state for further processing or packaging much sooner than prior art coating systems. As known to those of ordinary skill in the art, the cure time/gel time depends on the purity of the composition, the thickness of the coating, as well as the type and amount of catalyst employed.

In one embodiment, the cure time is about 5 minutes or greater, preferably about 5 minutes to about 60 minutes. For example, the cure time may be about 5 minutes to about 15 minutes. In still another embodiment, the cure time is about 15 minutes to about 30 minutes. In yet another embodiment, the cure time is about 30 minutes to about 60 minutes. In still another embodiment, the cure time is less than about 5 minutes. For example, the cure time may be about 2 minutes to about 3 minutes. However, the reaction time of the polyurea coating is preferably slow enough to ensure that the coating has sufficient time to flow out and form a glass-smooth surface, as well as adhere to the edges and concaves of the dimples.

The cure temperature may range from about 100° F. to about 180° F. In one embodiment, the temperature is from about 110° F. to about 175° F. In another embodiment, the temperature is about 130° F. to about 160° F. In still another embodiment, the temperature is about 140° F. to about 170° F.

The coating preferably achieves a Sward rocker hardness (ASTM D 2134-66) of about 5 or greater in about 60 minutes or less. For example, the coating may achieve a Sward rocker hardness of about 10 or greater in about 60 minutes. In one embodiment, the coating achieves a Sward rocker hardness of about 10 or greater in about 30 minutes or less. In another embodiment, the coating achieves a Sward rocker hardness of about 10 or greater in about 15 minutes or less. In still another embodiment, the coating achieves a Sward rocker hardness of about 10 or greater in about 10 minutes or less.

In one embodiment, substantially all of the coating remains adhered to the golf ball after repeated hits with a golf club. "Substantially all" is herein defined as at least about 90 percent, preferably at least about 95 percent, and more preferably at least about 99 percent, of the coating remains adhered to the golf ball.

The golf balls of the invention may also be painted or subjected to a indicia treatment, which may occur before coating, after coating, or both. For example, a golf ball of the invention may be treated with a base resin paint composition prior to applying the polyurea coating to achieve a desired color characteristic. In one embodiment, a high-tolerant primer is used prior to application of the coating layer. The primer layer may be still tacky at the time of the application of the coating to create a chemical crosslink between the primer and coating, thus increasing the durability of the finished golf ball.

In addition, an indicia may be applied to the golf ball prior to or after the coating, or after a base resin paint but before a coating. Conventional inks or paints may be used, however, the ink or paint may be ultraviolet curable, curable by e-beam, or radiation curable. Suitable materials are disclosed in U.S. Pat. Nos. 6,500,495, 6,248,804, and 6,099,415, the entire disclosures of which are incorporated by reference herein.

Furthermore, more than one coating layer may be used. In one embodiment, a golf ball of the invention is coated with a polyurea coating of the invention, treated with an indicia, and further subjected to an additional protective coating layer. The dual coating layers may both include the polyurea coating compositions of the invention. Alternatively, one of the coating layers may be a conventional coating layer, such as polyurethane, while the other may be the polyurea coating of the invention in order to decrease manufacturing costs.

Any trademarks or other indicia that may be used with the present invention may be applied to the ball through a variety of methods known to those of skill in the golf ball manufacturing art. For example the indicia may be pad-printed or ink-jet printed on the outer surface of the ball cover. The stamped outer surface is then treated with at least one layer of the polyurea coating composition of the invention to give the ball a glossy finish and protect the indicia stamped on the cover.

Golf Ball Properties

While the present invention is directed to polyurea coatings for golf equipment, the coated golf equipment as a whole is also contemplated by the present invention. For example, properties of a coated golf ball, as well as the properties of the components of the golf ball, such as hardness, modulus, layer thickness are important to the present invention because of their effect on play characteristics. It should be understood that the ranges herein are meant to be intermixed with each other, i.e., the low end of one range may be combined with a high end of another range.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. In one embodiment, the diameter is from about 1.68 inches to about 1.76 inches. In another embodiment, the diameter is from about 1.68 inches to about 1.74 inches. In addition, diameters anywhere in the range of from 1.7 to about 1.95 inches may be used. Preferably, the overall diameter of the core and all intermediate layers is about 80 percent to about 98 percent of the overall diameter of the finished ball.

The core may have a diameter ranging from about 0.09 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches.

The outermost structural layer of the golf ball, i.e., the cover, typically has a thickness to provide sufficient strength, good performance characteristics, and durability. In one embodiment, the cover thickness is from about 0.02 inches to about 0.35 inches. In another embodiment, the cover preferably has a thickness of about 0.02 inches to about 0.12 inches, preferably about 0.1 inches or less, more preferably about 0.07 inches or less. In yet another embodiment, the outer cover has a thickness from about 0.02 inches to about 0.07 inches. In still another embodiment, the cover thickness is about 0.05 inches or less, preferably from about 0.02 inches to about 0.05 inches. For example, the outer cover layer may be between about 0.02 inches and about 0.045 inches, preferably about 0.025 inches to about 0.04 inches thick. In one embodiment, the outer cover layer is about 0.03 inches thick.

When used, the intermediate layer thickness may vary depending on the desired goal of the intermediate layer. For example, the thickness of the intermediate layer may be about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The coating layer(s) preferably has a dry film thickness of about 0.1 mils to about 3 mils. For example, when a single coating layer is applied, the layer preferably has a dry film thickness of about 0.1 mils to about 1 mil. When several coating layers are applied, the total thickness is preferably about 0.5 mils to about 3 mils.

Hardness

Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

When a two-piece ball is constructed, the core may be softer than the outer cover. For example, the core hardness may range from about 30 Shore D to about 50 Shore D, and the cover hardness may be from about 50 Shore D to about 80 Shore D. In this type of construction, the ratio between the cover hardness and the core hardness is preferably about 1.75 or less. In another embodiment, the ratio is about 1.55 or less. Depending on the materials, for example, if a composition of the invention is acid-functionalized wherein the acid groups are at least partially neutralized, the hardness ratio of the cover to core is preferably about 1.25 or less.

The coating layer of the present invention preferably has a Sward rocker hardness of about 30 to about 80. In one embodiment, the fully cured coating has a Sward rocker hardness of about 40 to about 70. In still another embodiment, the Sward rocker hardness of the cured coating is about 45 to about 65.

Compression

Compression values are dependent on the diameter of the component being measured. Atti compression is typically used to measure the compression of a golf ball. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J.

The Atti compression of the core, or portion of the core, of golf balls prepared according to the invention is preferably less than about 80, more preferably less than about 75. In another embodiment, the core compression is from about 40 to about 80, preferably from about 50 to about 70. In yet another embodiment, the core compression is preferably below about 50, and more preferably below about 25. In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to about 120, and more preferably from about 60 to about 100. In yet another embodiment, the compression of the golf balls of the invention is about 75 or greater and about 95 or less. For example, a preferred golf ball of the invention may have a compression from about 80 to about 95.

Initial Velocity and COR

There is currently no USGA limit on the COR of a golf ball, but the initial velocity of the golf ball cannot exceed 250±5 feet/second (ft/s). Thus, in one embodiment, the initial velocity is about 245 ft/s or greater and about 255 ft/s or greater. In another embodiment, the initial velocity is about 250 ft/s or greater. In one embodiment, the initial velocity is about 253 ft/s to about 254 ft/s. In yet another embodiment, the initial velocity is about 255 ft/s. While the current rules on initial velocity require that golf ball manufacturers stay within the limit, one of ordinary skill in the art would appreciate that the golf ball of the invention would readily convert into a golf ball with initial velocity outside of this range. For example, a golf ball of the invention may be designed to have an initial velocity of about 220 ft/s or greater, preferably about 225 ft/s or greater.

As a result, of the initial velocity limitation set forth by the USGA, the goal is to maximize COR without violating the 255 ft/s limit. The COR of a ball is measured by taking the ratio of the outbound or rebound velocity to the incoming or inbound velocity. In a one-piece solid golf ball, the COR will depend on a variety of characteristics of the ball, including its composition and hardness. For a given composition, COR will generally increase as hardness is increased. In a two-piece solid golf ball, e.g., a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

In addition, the inner ball preferably has a COR of about 0.780 or more. In one embodiment, the COR is about 0.790 or greater.

Spin Rate

As known to those of ordinary skill in the art, the spin rate of a golf ball will vary depending on the golf ball construction. In a multilayer ball, e.g., a core, an intermediate layer, and a cover, wherein the cover is formed from the polyurea or polyurethane compositions of the invention, the spin rate of the ball off a driver ("driver spin rate") may be about 2000 rpm or greater. In one embodiment, the driver spin rate is about 2000 rpm to about 3500 rpm. In another embodiment, the driver spin rate is about 2200 rpm to about 3400 rpm. In still another embodiment, the driver spin rate may be less than about 2700 rpm.

Two-piece balls made according to the invention may also have driver spin rates of 1500 rpm and greater. In one embodiment, the driver spin rate is about 2000 rpm to about 3300 rpm. Wound balls made according to the invention preferably have similar spin rates.

Methods of determining the spin rate should be well understood by those of ordinary skill in the art. Examples of methods for determining the spin rate are disclosed in U.S. Pat. Nos. 6,500,073, 6,488,591, 6,286,364, and 6,241,622, which are incorporated by reference herein in their entirety.

Flexural Modulus

Accordingly, it is preferable that the golf balls of the present invention have an intermediate layer with a flexural modulus of about 500 psi to about 500,000 psi, which is measured using ASTM D-6272-98. More preferably, the flexural modulus of the intermediate layer is about 1,000 psi to about 250,000 psi. Most preferably, the flexural modulus of the intermediate layer is about 2,000 psi to about 200,000 psi.

The flexural modulus of the cover layer is preferably about 2,000 psi or greater, and more preferably about 5,000 psi or greater. In one embodiment, the flexural modulus of the cover is from about 10,000 psi to about 150,000 psi. More preferably, the flexural modulus of the cover layer is about 15,000 psi to about 120,000 psi. Most preferably, the flexural modulus of the cover layer is about 18,000 psi to about 110,000 psi. In another embodiment, the flexural modulus of the cover layer is about 100,000 psi or less, preferably about 80,000 or less, and more preferably about 70,000 psi or less. For example, the flexural modulus of the cover layer may be from about 10,000 psi to about 70,000 psi, from about 12,000 psi to about 60,000 psi, or from about 14,000 psi to about 50,000 psi.

In one embodiment, when the cover layer has a hardness of about 50 Shore D to about 60 Shore D, the cover layer preferably has a flexural modulus of about 55,000 psi to about 65,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

Specific Gravity

The specific gravity of a cover or intermediate layer is preferably at least about 0.7. In one embodiment, the specific gravity of the intermediate layer or cover is about 0.8 or greater, preferably about 0.9 or greater. For example, in one embodiment, the golf ball has an intermediate layer with a specific gravity of about 0.9 or greater and a cover having a specific gravity of about 0.95 or greater. In another embodiment, the intermediate layer or cover has a specific gravity of about 1.00 or greater. In yet another embodiment, the specific gravity of the intermediate layer or cover is about 1.05 or greater, preferably about 1.10 or greater.

The core may have a specific gravity of about 1.00 or greater, preferably 1.05 or greater. For example, a golf ball of the invention may have a core with a specific gravity of about 1.10 or greater and a cover with a specific gravity of about 0.95 or greater.

Level of Gloss

The coating layer of the present invention preferably also has a substantial level of gloss, so that the resulting golf ball has an aesthetically pleasing appearance. The gloss of any surface is dependent on the underlying material composition, the surface smoothness, and its ability to reflect light, particularly visible light.

Because gloss is a measure of specular reflection, i.e., the higher the percentage of reflection, the glossier the surface, the level of gloss is typically measured with a gloss meter, which projects an illumination beam at an angle onto a sample surface, and measures the percentage of reflected light over a small range of the reflection angle that is registered by a detector. The illumination is preferably near infrared, which is almost impervious to ambient light or the effect of different colors. The illumination angle is critical, particularly for non-metals (coatings, plastics), because it is positively correlated to the amount of specular reflection. The difference between illumination and reflection is absorbed or diffusely scattered dependent on the material and its color. The result of reported by the gloss meter, in Gloss Units of 0 (completely transparent) to 100 (completely reflective) is normalized not against the amount of the incident light, but against the amount of reflected light from a black glass standard with a defined refractive index, which is calibrated to 100 Gloss Units. Measuring standards for gloss include ASTM D523-89, titled "Standard Test Method for Specular Gloss" and ASTM D2457-97, titled "Standard Test Method for Specular Gloss of Plastic Films and Solid Plastics."

The coating layer of the present invention preferably has a 60° gloss of at least about 3, more preferably at least about 50, and most preferably about 85 or higher. In one embodiment, the coating has a 60° gloss of about 90 or greater. In still another embodiment, the coating has a 60° gloss of about 95 or greater. In yet another embodiment, the coating layer has a 20° gloss of preferably at least about 5, more preferably at least about 30, and most preferably about 70 to about 95. In one embodiment, the coating layer has a 20° gloss of about 85 to about 95.

Adhesion Strength

Skilled artisans are aware of methods to determine adhesion strength. For example, cross-hatch tests and repeated ball impact tests are useful to determine the adhesion strength of a particular layer or coating of a golf ball. Repeated impact tests generally involve either subjecting the golf ball to repeated hits with a golf club or subjecting the golf ball to repeated impact under a free falling weight. The durability of the ball may then be measured by the number of repeated impacts before cracks or crazes appear on the surface.

When golf balls are formed with the coatings of the invention, there are preferably no cracks or crazes after about 100 hits or more. In one embodiment, the coatings of the invention prevent cracks or crazes until after about 200 hits or more. In still another embodiment, golf balls formed with the coatings of the invention do not have any cracks or crazes until after about 300 hits or more. In yet another embodiment, golf balls formed with the coatings of the invention do not have any cracks or crazes until after about 600 hits or more.

The cross-hatch test consists of cutting the material into small pieces in mutually perpendicular directions, applying a piece of adhesive cellophane tape over the material, rapidly pulling off the tape, and counting the number of pieces removed. The repeated impact test consists of subjecting the finished golf ball to impact repeatedly and visually examining the coating film for peeling from the golf ball. Examples of these methods are provided in U.S. Pat. No. 5,316,730, which is incorporated by reference herein.

Abrasion Resistance

The coatings of the present invention advantageously provide enhanced abrasion resistance as compared to prior art coatings. Many factors contribute to this improvement, e.g., less surface imperfections from moisture and/or humidity and better adherence to the uncoated substrate. Abrasion resistance may be tested in a variety of ways. For example, coated golf balls may be tested using the standard method for abrasion resistance of organic coatings by the Taber Abraser, i.e., ASTM D4060-84. Using this method, the polyurea coated golf balls of the invention preferably have a total change in weight at least about 50 percent less than prior art coated golf balls. In one embodiment, the change in weight of the polyurea coated golf ball of the invention is at least about 70 percent less than a polyurethane or epoxy-coated golf ball. In still another embodiment, the polyurea coated golf ball has a weight change of at least about 75 percent less than a polyurethane or epoxy coated golf ball.

Moisture Resistance

The water resistance of a golf ball having a polyurea coating of the invention may be expressed in terms of weight gain over a period of time. For example, weight changes of a golf ball portion may be monitored over a period of seven weeks in 100 percent relative humidity and 72° F. to demonstrate which balls have better water resistance.

Thus, a golf ball of the invention, including the polyurea coating, preferably has a weight gain of less than about 0.4 grams or less after a seven week storage period in 100 percent humidity at 72° F. In one embodiment, the golf ball preferably has a weight gain of about 0.15 grams or less. In another embodiment, the golf balls of the invention have a weight gain of about 0.13 grams or less after a seven-week storage period. In still another embodiment, the golf ball has a weight gain of about 0.09 grams or less. For example, the weight gain may be about 0.06 grams or less, preferably about 0.03 grams or less after a seven-week storage period.

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the invention disclosed herein is well calculated to fulfill the objects stated above, it will be appreciated that numerous modifications and embodiments may be devised by those skilled in the art. For example, while golf balls and golf ball components are used as examples for articles coated with the compositions of the invention, other golf equipment may be coated with the compositions of the invention. In one embodiment, at least a portion of a golf shoe is coated with the composition of the invention. In another embodiment, the composition of the invention is used to coat at least a portion of a golf club, e.g., a putter insert. Furthermore, the polyurea coatings of the invention may be used on other game balls, such as softballs, baseballs, cricket balls. Therefore, it is intended that the appended claims cover all such modifications and embodiments that fall within the true spirit and scope of the present invention.

We claim:

1. A method of coating golf equipment comprising the steps of:
   providing an amine-terminated component;
   wherein the amine-terminated component comprises amine terminated polybutadiene;
   providing an isocyanate;
   reacting the amine-terminated component and the isocyanate to form a reaction product comprising polyurea linkages;
   applying the coating composition to the golf equipment; and
   curing the coating composition at a temperature of 60° C. or lower;
   wherein the coating has a dry film thickness of about 0.1 mils to about 1 mils.

2. The method of claim 1, wherein the step of curing further comprises subjecting the coating composition to the temperature of 60° C. or lower for a period of about 5 minutes to about 60 minutes.

3. The method of claim 1, wherein the amine-terminated component comprises a hydrophobic backbone.

4. The method of claim 1, further comprising the step of adding at least one an optical brightener, silane coupling agent, catalyst, pigment, filler, wetting agent, solvent, or a combination thereof during the step of reacting.

5. The method of claim 1, wherein the step of reacting further comprises adding a solvent.

6. The method of claim 5, wherein the solvent is present in the composition in an amount of about 10 percent to about 35 percent by weight of the coating composition.

7. The method of claim 1, wherein the amine-terminated component comprises secondary amines.

8. The method of claim 1, wherein the step of curing further comprises subjecting the coating composition to the temperature of 60° C. or lower for a period of about 30 minutes to about 60 minutes.

9. The method of claim 1, wherein the step of curing further comprises subjecting the coating composition to the temperature of 60° C. or lower for a period of about 2 minutes to about 3 minutes.

10. The method of claim 1, wherein the amine-terminated polybutadiene comprises primary amines, secondary amines, or a combination thereof.

11. The method of claim 1, wherein at least one of the amine-terminated component or the iscoyanate are aliphatic.

12. A golf ball comprising a core and a cover, wherein a coating layer disposed about the cover is formed of a reaction product consisting essentially of at least one isocyanate and at least one amine-terminated polybutadiene.

13. The golf ball of claim 12, wherein the reaction product has a cure time of about 5 minutes to about 60 minutes.

14. The golf ball of claim 13, wherein the reaction product has a cure time of about 30 minutes to about 60 minutes.

15. The golf ball of claim 12, wherein the reaction product has a cure time of about 2 minutes to about 3 minutes.

16. The golf ball of claim 12, wherein the reaction product has a cure temperature of 60° C. or lower.

17. The golf ball of claim 15, wherein the isocyanate is aliphatic.

* * * * *